United States Patent [19]

Tebben

[11] 3,795,333
[45] Mar. 5, 1974

[54] TRAILER RAMP APPARATUS

[76] Inventor: John A. Tebben, Clara City, Minn. 56222

[22] Filed: Aug. 14, 1972

[21] Appl. No.: 280,321

[52] U.S. Cl. .................................. 214/85, 14/71
[51] Int. Cl. ............................................ B65g 67/02
[58] Field of Search ........... 214/85, 85.1; 14/71, 72; 296/61

[56] References Cited
UNITED STATES PATENTS

| | | | |
|---|---|---|---|
| 2,436,467 | 2/1948 | Winter | 214/85 |
| 2,437,479 | 3/1948 | Price | 214/85 |
| 3,307,719 | 3/1967 | Martin, Jr. | 214/85 |
| 3,138,272 | 6/1964 | Flowers | 214/85 |

*Primary Examiner*—Albert J. Makay
*Attorney, Agent, or Firm*—Stuart R. Peterson

[57] ABSTRACT

A flat bed trailer has a sloping tail section to which a pair of ramp units are hingedly attached. When lowered into a ground-engaging position, the ramp units provide at each side of the trailer a rearward continuation of the sloping tail surface, thereby enabling heavy equipment to be loaded onto the trailer. When the ramp units are swung upwardly into a raised position, the sloping surfaces on the ramp units complementally confront the sloping tail surface so that the bottom of the two ramp units then present horizontal surfaces which provide a more complete or larger flat bed than would otherwise be available.

5 Claims, 6 Drawing Figures

TRAILER RAMP APPARATUS

BACKGROUND OF THE INVENTION

This invention relates generally to trailers for transporting heavy equipment, and pertains more particularly to a trailer utilizing ramps over which the equipment is moved when being loaded onto the trailer.

SUMMARY OF THE INVENTION

One general object of the invention is to provide a pair of inexpensive ramp units that provide inclined surfaces over which the equipment to be loaded onto a trailer can readily be moved.

Another object is to provide apparatus of the foregoing type in which the ramp units are always available for either loading or unloading the trailer, the units being hingedly connected to the tail section of the trailer.

Another object of the invention is to provide ramps that can be tipped or swung upwardly so that the bottom surfaces thereof then reside in a horizontal plane to thereby enable the full length of the flat bed trailer to be utilized.

Yet another object is to provide ramp apparatus for trailers in which no blocking is needed during the loading operation.

Briefly, my invention envisages a wheeled trailer having a sloping tail section to which are hingedly attached two ramp units. When in loading position, the ramp units have a portion extending beneath the transverse I-beam at the rear of the tail section. Yet, the specific hinge mechanism permits the ramp units to be individually swung upwardly so that the sloping surfaces thereof used during the loading procedure are then in a face-to-face relationship with the sloping tail section; the now uppermost bottoms of the ramp units provide horizontal surfaces so that a larger usable flat surface or bed is formed. The hinge mechanisms for the ramp units are so constructed and positioned that the downward movement of the I-beam resulting from the loading is accommodated for without having to block either the tail section or the ramp units.

DESCRIPTION OF THE PREFERRED EMBODIMENT

Figure 1:
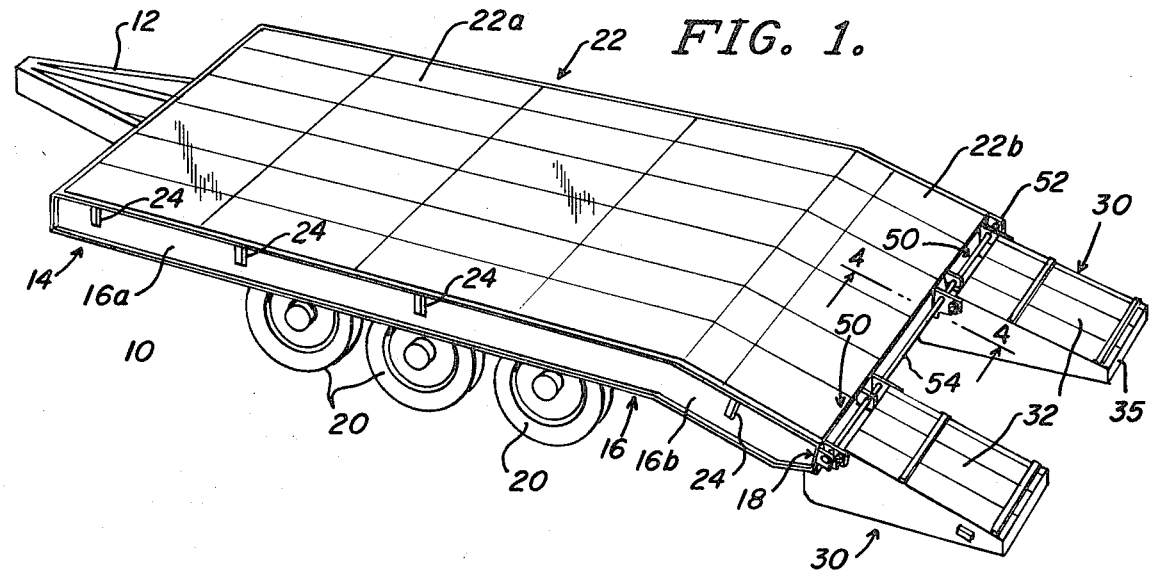
FIG. 1 is a perspective view of a wheeled trailer with my ramp units in their ground-engaging position which permits the loading of heavy equipment onto the trailer.

In FIG. 1, a trailer has been denoted in its entirety by the reference numeral 10, the trailer having a drawbar 12 for connection to a tractor or truck (not shown). The trailer includes a frame 14 composed of longitudinally and transversely directed I-beams. One longitudinal beam 16, this being the beam extending along the left side of the trailer 10, includes a horizontal portion 16a and a sloping portion 16b. The particular side beam just alluded to is visible in FIGS. 1, 2, 3 and 6. In actual practice, the frame 14 utilizes five such beams and a second beam, owing to the direction in which the cross sectional view is taken, appears in FIG. 4. While eight transverse I-beams 18 are utilized in actual practice, only the transverse I-beam at the rear is of interest as far as the description of the invention is concerned. As best viewed in FIG. 4, the beam 18 at the rear includes a web 18a, an upper flange 18b and a lower flange 18c.

Attached to the underside of the frame 14 in a conventional manner is a plurality of wheels 20. In the illustrative situation, six such wheels are employed, but it will be understood that any suitable number of wheels can be used, the number depending to a degree on the load to be transported.

Forming the deck of the trailer 10 are floor panels 22, there being a first group of such panels providing a horizontal surface area or flat bed 22a in that these particular panels are attached to the horizontal portions 16a of the I-beams 16 and a second group of panels forming a tail section 22b having a sloping surface. The panels 22 laterally overhang the sides of the frame 14. Therefore, in order to provide underlying support at the sides, gussets 24 are employed, these members being welded to the two outboard beams 16.

Playing an important role in the practicing of the invention are two ramp units 30 fabricated of heavy sheet metal. More specifically, it will be observed that each unit 30 includes a number of panels welded together to form a sloping top section 32, vertical side walls 34, a relatively low vertical rear wall 35, a relatively high vertical front wall 36, and a flat bottom section 38.

Figure 4:
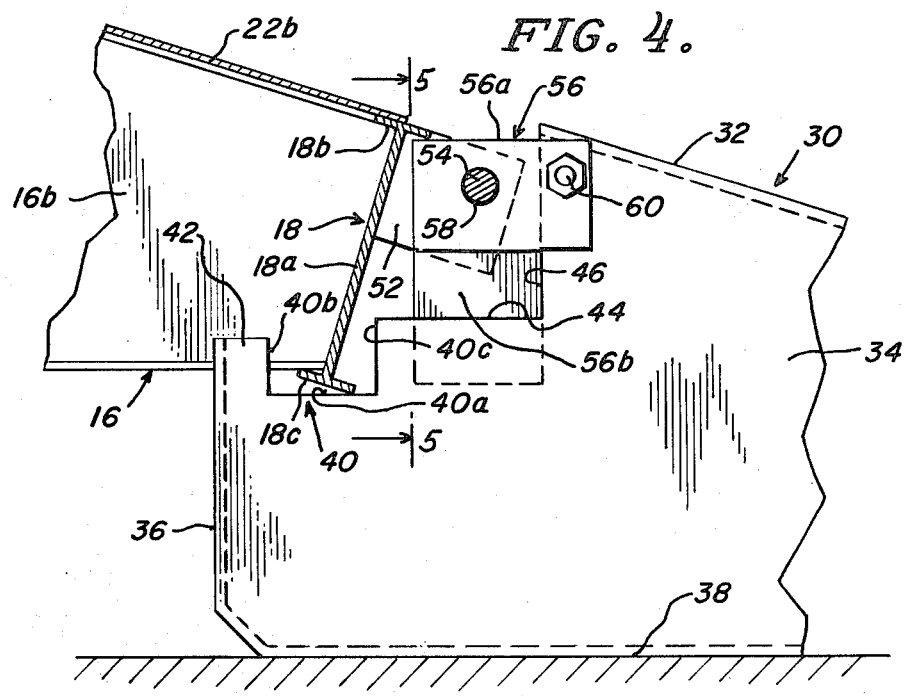
FIG. 4 is a view corresponding to FIG. 3 with a load (not shown) transferred onto the tail section of the trailer, the view being taken in the direction of line 4—4 of FIG. 1 (even though FIG. 1 does not illustrate a loaded condition)

As perhaps best seen in FIG. 4 due to the enlarged scale of this particular figure, the side walls 34 of each unit 30 are formed with a notch 40 having a horizontal bottom edge 40a, a vertical forward edge 40b and a vertical rear edge 40c. The vertical forward edge 40b is spaced rearwardly somewhat from the vertical front wall 36 to form an upstanding hook portion at 42. To complete the description of the side walls 34 of each unit 30, it will be discerned that there is a horizontal edge 44 leading rearwardly from the vertical edge 40c and a vertical edge 46 extending upwardly from the horizontal edge 44 at the rear thereof. Actually, as can readily be seen from FIG. 4, the vertical edge 46 extends completely to the sloping top section 32.

At this time, attention is called to two hinge mechanisms designated generally by the numeral 50 in each instance which provide pivotal connection of the two ramp units 30 to the transverse I-beam 18, more specifically, the web 18a thereof. Each hinge mechanism 50 includes a pair of rearwardly directed lugs 52 that are fixedly attached, as by welding, to the web 18a. The lugs 52 are apertured so as to accommodate a rod or bar 54. While the rod or bar 54 could be journaled in the various lugs 52, such member extending the full width of the tail section 22b, it is planned that the member 54 be welded to the various lugs 52.

Figure 5:
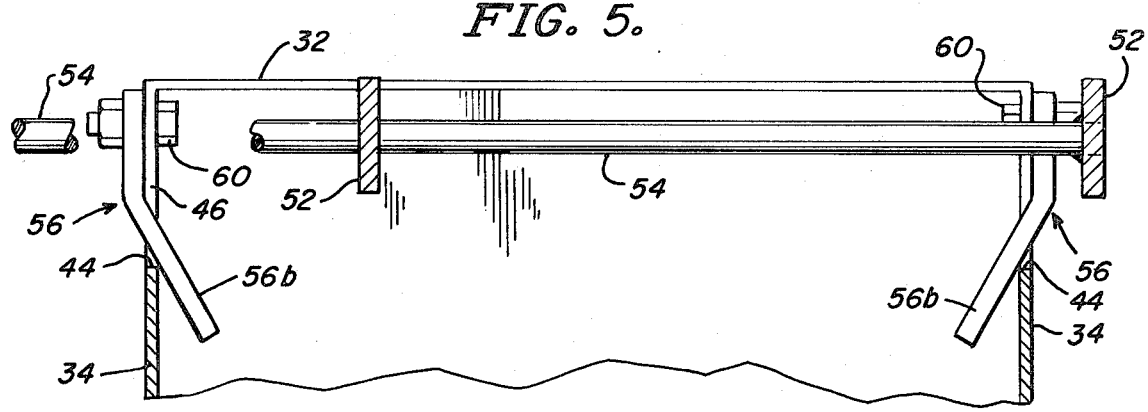
FIG. 5 is a sectional view taken in the direction of line 5—5 of FIGS. 3 and 4, the scale of FIG. 5 being commensurate with that of FIG. 4.

Continuing with the description of the hinge mechanisms 50, it will be perceived that each one further includes what will be termed L-shaped links 56, there being two for each hinge mechanism 50. Each link 56 includes a strip 56a having a downwardly projecting ear 56b. Each ear 56b functions as a jack, as will become clearer as the description progresses, and it will be observed from FIG. 5 that the two ears or jacks 56b of each hinge mechanism 50 angle relative to the strips 56a, actually inclining or angling inwardly toward each other so as to engage the vertical edges 46.

Each strip 56a is apertured at 58 so as to receive therein the rod or bar 54. In other words, the strips 56a are pivotally mounted on portions of the member 54. Additional apertures are provided in the rear portions of the strips 56a for the accommodation of pins or bolts 60 which extend through their respective strips 56a and also through the side walls 34 of the ramp units 30.

Figure 6:
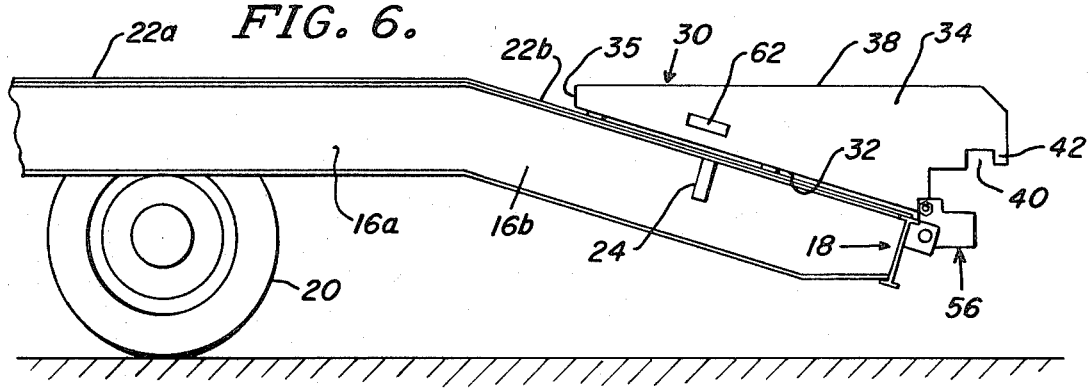
FIG. 6 is a fragmentary sectional view illustrating the ramp units when swung or tipped upwardly into the position they assume when the trailer is to be pulled from one vantage point to another.
Figure 3:
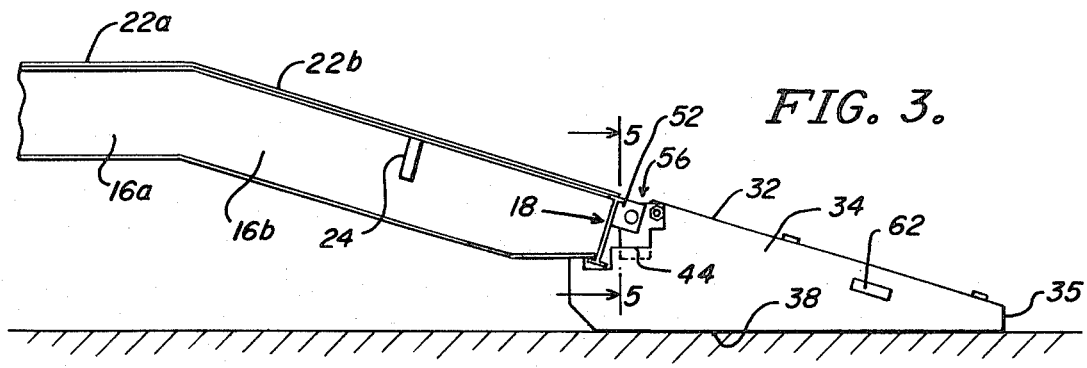
FIG. 3 is a fragmentary side elevational view corresponding to FIG. 2 but with the tail section rocked downwardly due to a load (not depicted) being moved onto the trailer.
Figure 2:
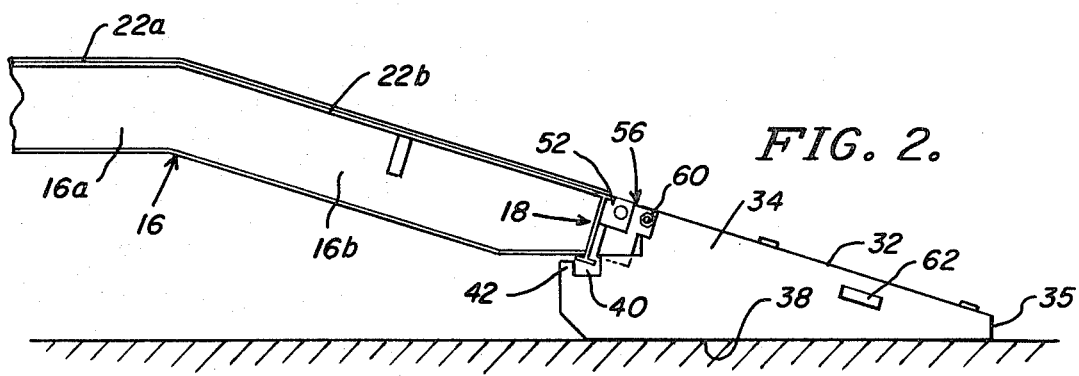
FIG. 2 is a fragmentary side elevational view corresponding to FIG. 1, the view showing the sloping tail section and one of the ramp units.

By means of handles 62 attached to the side walls 34, each ramp unit 30 can be swung upwardly from its ground-engaging position as illustrated in FIGS. 1-4 to the position shown in FIG. 6. In this regard, it is to be observed that the sloping top sections 32 complement the slope of the tail section 22b so that when tipped into their raised position as illustrated in FIG. 6, the bottom sections 38 of the ramp units 30 form flat surfaces which are at the same elevation as the floor panels 22a. In this way, an enlarged flat bed 22a is provided by reason of the sections 38 which function as extensions thereof.

Operation

Although the manner of using my trailer 10 should be readily understood from the information hereinabove given, an operational description will be of assistance in appreciating the full benefits to be derived. Accordingly, when heavy equipment is to be loaded on the trailer 10, all that the user need do is swing the pair of ramp units 30 from their elevated position shown in FIG. 6 to their ground-engaging position shown in FIGS. 1-4. Without any load on the trailer 10, the upstanding hook portions 42 pass beneath the lower flange 18c of the I-beam 18. The resulting condition is portrayed in FIG. 2. From this particular figure, it will be noted that the lower flange 18c is in a spaced relationship above the bottom edge 40a of the notch 40.

The ramp units 30 are now in readiness for movement of the equipment (not pictured) up the sloping top sections 32 onto the sloping tail section 22b and finally onto the flat bed 22a. In the process of moving up the ramp units 30, the weight of the equipment when transferred onto the tail section 22b forces the I-beam 18 downwardly. This causes the flange 18c to engage the bottom edges 40a of the various notches 40.

The articulated construction of the hinge mechanisms 50 enables the foregoing to occur. In this regard, it can be noted from FIG. 4 that the L-shaped links 56 rotate in a counterclockwise direction about the pins or bolts 60. However, the amount of rotation is limited by the ears or jacks 56b striking against the previously mentioned vertical edges 46. It should be recognized at this stage that the ears 56b incline inwardly and therefore sufficient angular movement thereof causes them to obstructively engage the various vertical edges 46.

Stated somewhat differently, when the lower flange 18c of the I-beam 18 engages the bottom edges 40a of the notches 40, further movement downwardly of the I-beam is resisted. However, if the ramp units 30 are resting on relatively soft or uneven ground, there could very well be a tendency for the forward portions of the ramp units to dig into the soil when soft or to rock on uneven terrain. In other words, there would be a fulcrumming that would cause the rear vertical walls 36 to tip upwardly. However, the engagement of the ears or jacks 56b against the vertical edges 46 prevent this from occurring. It will be further perceived that the notches 40 are spaced rearwardly from the front vertical edges 46 so as to minimize the likelihood of this happening. By reason of the obstructive engagement, however, of the ears 56b with the vertical edges 46 there is an avoidance of any tipping up of the ramp units 30 as alluded to just above.

When the equipment has moved onto the horizontal floor panels or flat bed 22a, the load is, of course, transferred onto the wheels 20 with the consequence that there is no further loading of the ramp units 30. The two ramp units 30 can then be swung upwardly from their ground-engaging position to the raised or elevated position shown in FIG. 6. It will be assumed that the equipment has been moved sufficiently forwardly on the flat bed 22a to prevent any interference with the upward tipping of the ramp units 30 into the position illustrated in FIG. 6. Once the ramp units 30 have been tipped into the relationship shown in FIG. 6, then the equipment can be moved rearwardly, if desired, so that a portion thereof rests on the bottom sections 38 which now form continuations of the flat bed 22a.

At no time when utilizing my invention is there any need for blocking the tail section 22b. Furthermore, completely firm ground upon which the ramp units 30 rest during the loading operation is not required, although the firmer the ground, the better when exceptionally heavy equipment is to be transported.

It will be further noted that no tools or implements of any type are required in effecting the loading of equipment. Once loaded, then the trailer 10 is towed to its destination and the ramp units 30 swung back to their ground-engaging positions so as to permit the equipment to be rolled back down. The ramp units 30 are always available for either loading or unloading, there being no attaching or detaching required.

I claim:

1. In combination, a trailer having a downwardly sloping tail section including a transverse member extending across the rear thereof, at least one ramp unit also having a downwardly sloping section, means hingedly connecting said ramp unit to said tail section, said ramp unit having a portion thereof extending forwardly beneath said transverse member when said ramp unit is lowered, said hinge means including a pair of laterally spaced strips pivotally connected at one end to said transverse member, said ramp unit having vertical side walls providing forward vertical edges, the other ends of said laterally spaced strips being pivotally connected to said side walls and residing in generally parallel vertical planes, said strips having downwardly and inwardly angled ears engageable with said vertical edges, whereby when a load is moved up said ramp section onto said tail section said transverse member moves downwardly onto said forwardly extending portion, engagement of said angled ears with said vertical edges limiting downward movement of said tail section relative to said ramp unit.

2. The combination set forth in claim 1 in which the forward portion of said ramp unit has a notch for receiving the lower edge of said transverse member, said forwardly extending portion constituting the bottom of said notch.

3. The combination set forth in claim 1 in which said hinge means further includes a pair of laterally spaced lugs projecting rearwardly from said transverse member and a horizontal rod carried by said lugs, the forward ends of said strips having holes therein through which said rod passes to pivotally connect the forward ends of said strips to said tail section.

4. The combination set forth in claim 3 in which the forward portion of said ramp unit has a notch for receiving the lower edge of said transverse member, the bottom of said notch constituting the portion of said ramp unit extending forwardly beneath said transverse member and said transverse member constitutes an I-beam, said lugs being fixedly attached to the web portion of said I-beam just beneath the upper flange thereof and the lower flange of said I-beam being receivable in said notch.

5. The combination set forth in claim 4 in which the sloping surface of said ramp section complements the sloping surface of said tail section, and the bottom surface of said ramp unit, when said ramp unit is tilted upwardly, provides a horizontal surface.

* * * * *